United States Patent
Chun et al.

(10) Patent No.: US 8,817,646 B2
(45) Date of Patent: Aug. 26, 2014

(54) METHOD AND APPARATUS FOR MANAGING SYSTEM INFORMATION IN WIRELESS COMMUNICATION SYSTEM SUPPORTING MULTI-CARRIERS

(75) Inventors: Sung Duck Chun, Anyang-si (KR); Sung Hoon Jung, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 126 days.

(21) Appl. No.: 13/379,281

(22) PCT Filed: Jun. 14, 2010

(86) PCT No.: PCT/KR2010/003799
§ 371 (c)(1),
(2), (4) Date: Dec. 19, 2011

(87) PCT Pub. No.: WO2010/150998
PCT Pub. Date: Dec. 29, 2010

(65) Prior Publication Data
US 2012/0099464 A1    Apr. 26, 2012

Related U.S. Application Data

(60) Provisional application No. 61/219,366, filed on Jun. 22, 2009.

(51) Int. Cl.
*H04W 88/02* (2009.01)
*H04L 27/10* (2006.01)

(52) U.S. Cl.
USPC ............ 370/252; 370/329; 455/450; 455/423

(58) Field of Classification Search
CPC ........... H04L 1/00; H04L 5/0044; H04L 5/22; H04L 27/00; H04L 27/2607; H04L 27/2608; H04W 24/02; H04W 52/04; H04W 72/02; H04W 72/08; H04W 88/02; H04J 3/00
USPC ................. 370/236–255, 276–282, 389–469
See application file for complete search history.

(56) References Cited

U.S. PATENT DOCUMENTS

| | | |
|---|---|---|
| 2002/0159470 A1 | 10/2002 | Atarashi et al. |
| 2007/0268900 A1 | 11/2007 | Park et al. |
| 2008/0212698 A1 | 9/2008 | Kim et al. |

(Continued)

FOREIGN PATENT DOCUMENTS

KR    10-0461666 B1    12/2004

*Primary Examiner* — Jeffrey M Rutkowski
*Assistant Examiner* — John Lequang
(74) *Attorney, Agent, or Firm* — Birch, Stewart, Kolasch & Birch, LLP

(57) ABSTRACT

Discussed are a method and an apparatus for managing system information in a wireless communication system supporting multi-carriers. According to one embodiment of the present invention, a method by which user equipment obtains system information in a wireless communication system supporting multi-carriers comprises the steps of: receiving from a base station a message including information related to modification to system information of one or more component carriers; determining whether the system information of a component carrier from among the plurality of component carriers, which is set to the user equipment, is to be modified, based on the information related to the modification to the system information of the one or more component carriers; and obtaining the modified system information of the component carrier set at the user equipment when it is determined that the system information of the component carrier set at the user equipment is to be modified.

12 Claims, 10 Drawing Sheets

(56) References Cited

U.S. PATENT DOCUMENTS

| | | | |
|---|---|---|---|
| 2008/0242308 A1* | 10/2008 | Gunnarsson et al. | 455/450 |
| 2009/0088148 A1* | 4/2009 | Chung et al. | 455/423 |
| 2010/0098012 A1* | 4/2010 | Bala et al. | 370/329 |
| 2010/0118720 A1* | 5/2010 | Gauvreau et al. | 370/252 |
| 2010/0151857 A1* | 6/2010 | Brisebois et al. | 455/434 |
| 2010/0227569 A1* | 9/2010 | Bala et al. | 455/73 |
| 2010/0232382 A1* | 9/2010 | Gauvreau et al. | 370/329 |
| 2011/0110315 A1* | 5/2011 | Chen et al. | 370/329 |

* cited by examiner

US 8,817,646 B2

METHOD AND APPARATUS FOR MANAGING SYSTEM INFORMATION IN WIRELESS COMMUNICATION SYSTEM SUPPORTING MULTI-CARRIERS

CROSS REFERENCE TO RELATED APPLICATIONS

This application is the National Phase of PCT/KR2010/003799 filed on Jun. 14, 2010, which claims priority under 35 U.S.C. 119(e) to U.S. Provisional Application No. 61/219,366 filed on Jun. 22, 2009, all of which are hereby expressly incorporated by reference into the present application.

TECHNICAL FIELD

The present invention relates to a wireless communication system, and more particularly, to a method and apparatus for managing system information in a wireless communication system that supports multi-carriers.

BACKGROUND ART

Generally, one carrier is mainly taken into consideration in a wireless communication system although an uplink and a downlink are set to differ from each other in bandwidth. For instance, based on a single carrier, it may be able to provide a wireless communication system, in which the number of carrier configuring each of uplink and downlink is set to 1 and in which bandwidths of the uplink and downlink are symmetric to each other in general.

According to ITU (international telecommunication union), a technology candidate for IMT-Advanced is requested to support a bandwidth extended more than that of a conventional wireless communication system. Yet, frequency allocation of wider bandwidth is not globally available for many areas except some particular areas. As a technology for using fragmented small bands efficiently, there is an ongoing development of carrier aggregation (e.g., bandwidth aggregation, spectrum aggregation, etc.) to bring the same effect of using a band of logically wider bandwidth by physically bundling a plurality of bands together.

Carrier aggregation is introduced to support an increasing throughput, prevent a cost increase due to an introduction of a broadband RF device, and secure compatibility with a legacy system. Carrier aggregation is the technology for enabling data to be exchanged between a user equipment and a base station through a plurality of bundles of carriers by bandwidth unit defined in a legacy wireless communication (e.g., LTE system in case of LTE-A system, IEEE 802.16e system in case of IEEE 802.16m system). In this case, a carrier of a bandwidth unit defined in a legacy wireless communication system may be called a component carrier (hereinafter abbreviated CC). For instance, the carrier aggregation technology may include a scheme of supporting a system bandwidth up to maximum 100 MHz by making a bundle of maximum 5 CCs despite that one CC supports a bandwidth of 5 MHz, 10 MHz or 20 MHz.

Meanwhile, a user equipment may receive a paging message containing information, which indicates system information modification) by monitoring a downlink channel. However, in case that multi-carriers are applied according to the carrier aggregation technology, a method for a user equipment to receive information on system information modification has not been discussed in detail.

DISCLOSURE OF THE INVENTION

Technical Task

In case that multi-carriers are applied, when a user equipment receives a paging message by motoring all downlink component carriers, it causes a problem that battery consumption of the user equipment is increased.

A technical task of the present invention is to provide a method and apparatus for a user equipment to efficiently receive a paging message containing information on system information modification.

Technical Solution

To achieve these and other advantages and in accordance with the purpose of the present invention, as embodied and broadly described, according to one embodiment of the present invention, a method of obtaining system information by a user equipment in a wireless communication system supporting multi-carriers may comprise: receiving a message including information on a system information modification (systemInfoModification) of at least one component carrier from a base station; determining whether the system information of a component carrier set for the user equipment among a plurality of component carriers is to be modified, based on the information on the system information modification of the at least one component carrier; and obtaining the modified system information of the component carrier set for the user equipment, if the system information of the component carrier set for the user equipment is determined to be modified.

Preferably, the information on the system information modification of the at least one component carrier is the information indicating whether the system information for each of the at least one component carrier is to be modified.

Preferably, the information on the system information modification of the at least one component carrier may include the information on the system information modification of all component carriers provided by the base station.

Preferably, the receiving the message is performed by monitoring one predetermined downlink component carrier.

More preferably, the one predetermined downlink component carrier is a downlink primary component carrier or P-cell.

Preferably, the obtaining the modified system information is performed via the component carrier of which system information is determined to be modified among the component carriers set for the user equipment.

Preferably, receiving the message is performed in $n^{th}$ modification period and wherein the obtaining the modified system information is performed in $(n+1)^{th}$ modification period.

Preferably, the component carrier set for the user equipment includes at least one of at least one uplink component carrier or at least one downlink component carrier set for the user equipment.

Preferably, the message may include a paging message.

To further achieve these and other advantages and in accordance with the purpose of the present invention, according to another embodiment of the present invention, a method of providing system information to a user equipment by a base station in a wireless communication system supporting multi-carriers may comprise: transmitting a message including information on a system information modification (systemInfoModification) of at least one component carrier; and transmitting a modified system information of the at least one component carrier, wherein the message including information on the system information modification of the at least one component carrier is used to determine whether the system information of a component carrier set for the user equipment among the at least one component carrier is to be modified, and wherein the message including information on the system information modification of the at least one component carrier is used to determine whether the system information of a component carrier set for the user equipment among the at least one component carrier is to be modified.

Preferably, the information on the system information modification of the at least one component carrier is the information whether the system information for each of the at least one component carrier is to be modified.

Preferably, the information on the system information modification of the at least one component carrier may include the information on the system information modification of all component carriers provided by the base station.

Preferably, the message may be transmitted via a downlink channel on one predetermined downlink component carrier.

Preferably, the one predetermined downlink component carrier is a downlink primary component carrier or P-cell.

Preferably, the modified system information may be obtained by the user equipment via the component carrier of which system information is determined to be modified among the component carriers set for the user equipment.

Preferably, the transmitting the message is performed in $n^{th}$ modification period and wherein the transmitting the modified system information is performed in $(n+1)^{th}$ modification period.

Preferably, the component carrier set for the user equipment includes at least one of at least one uplink component carrier or at least one downlink component carrier set for the user equipment.

Preferably, the message may include a paging message.

To further achieve these and other advantages and in accordance with the purpose of the present invention, according to yet another embodiment of the present invention, a user equipment for obtaining system information in a wireless communication system supporting multi-carriers may comprise: a processor comprising: an RRC (Radio Resource Control) layer module performing a RRC connection control function including a paging; a MAC (medium access control) layer module controlling signal transmission and reception set for the user equipment via the multi-carriers; and a physical layer module functionally connected with the MAC layer module, the physical layer module performing the signal transmission and reception via the multi-carriers set for the user equipment, the processor is configured to: receive a message including information on a system information modification (systemInfoModification) of at least one component carrier from a base station, determine whether the system information of a component carrier set for the user equipment among a plurality of component carriers is to be modified, based on the information on the system information modification of the at least one component carrier via the RRC layer module, obtain the modified system information of the component carrier set for the user equipment, if the system information of the component carrier set for the user equipment is determined to be modified.

To further achieve these and other advantages and in accordance with the purpose of the present invention, according to a yet another embodiment of the present invention, a base station for providing system information in a wireless communication system supporting multi-carriers may comprise: a processor comprising: an RRC (radio resource control) layer module performing a RRC connection control function including a paging; a MAC (medium access control) layer module controlling signal transmission and reception set for the user equipment via the multi-carriers; and a physical layer module functionally connected with the MAC layer module, the physical layer module performing the signal transmission and reception via the multi-carriers, the processor is configured to: transmit a message including information on a system information modification (systemInfoModification) of at least one component carrier via the physical layer module and transmit a modified system information of the at least one component carrier, wherein the message including information on the system information modification of the at least one component carrier is used by the user equipment to determine whether the system information of a component carrier set for the user equipment among the at least one component carrier is to be modified, and wherein the modified system information of the at least one component carrier is obtained as the modified system information of the component carrier set for the user equipment by the user equipment, if the system information of the component carrier set for the user equipment is determined to be modified.

The above-mentioned general description for the present invention and the following details of the present invention may be exemplary and are provided for the additional description for the inventions in the appended claims.

Advantageous Effects

According to each embodiment of the present invention mentioned in the foregoing description, a user equipment is able to efficiently receive a paging message containing information on system information modification. Therefore, battery consumption of the user equipment is reduced and the user equipment is able to obtain system information modified for a component carrier set for the user equipment accurately and efficiently.

Effects obtainable from the present invention are non-limited by the above mentioned effect. And, other unmentioned effects can be clearly understood from the following description by those having ordinary skill in the technical field to which the present invention pertains.

BEST MODE FOR INVENTION

Figure 1:
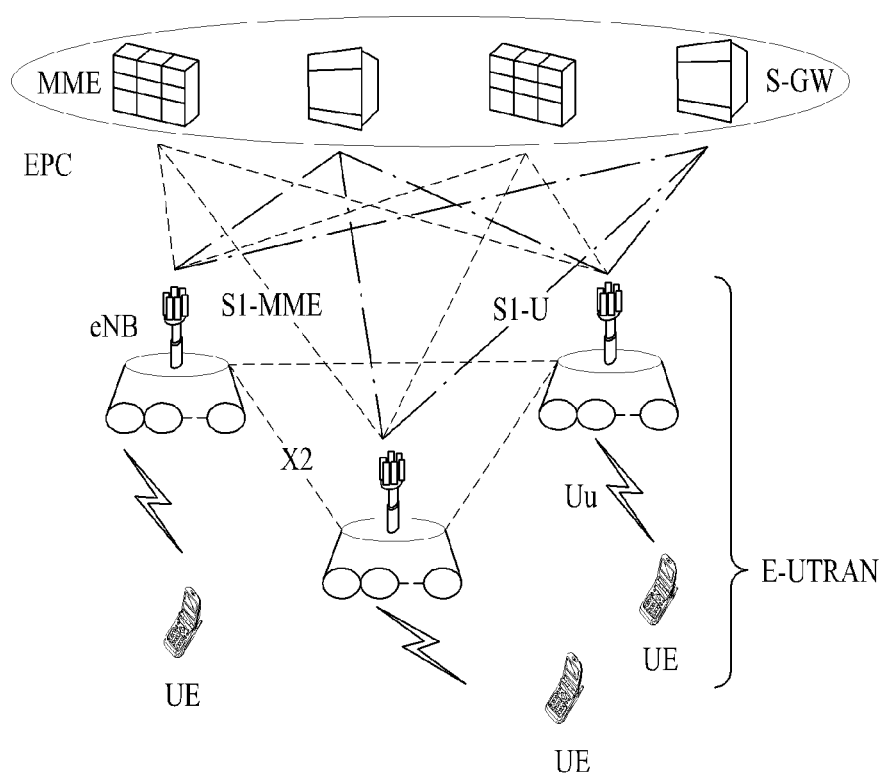
FIG. 1 is a diagram for a structure of a wireless communication system.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

In the following description, specific terminologies used for embodiments of the present invention are provided to help the understanding of the present invention. And, the use of the specific terminology may be modified into another form within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

LTE System Structure

A system structure of LTE system is described for one example of a wireless communication system, to which the present invention is applicable, with reference to FIG. 1 as follows. LTE system is a mobile communication system evolved from UMTS system. Referring to FIG. 1, an LTE system structure may be mainly divided into E-UTRAN (evolved UMTS terrestrial radio access network) and EPC (evolved packet core). The E-UTRAN includes UE (user equipment) and eNB (evolved NodeB: base station). Uu interface connects the UE and the eNB together. And, X2 interface connects eNBs together. The EPC includes MME (mobility management entity) responsible for a control plane function and S-GW (serving gateway) responsible for a user plane function. S1-MME interface connects the eNB and the MME together and S1-U interface connects the eNB and the S-GW together. Particularly, theses 2 interfaces may be called S1 interface overall.

Figure 2:
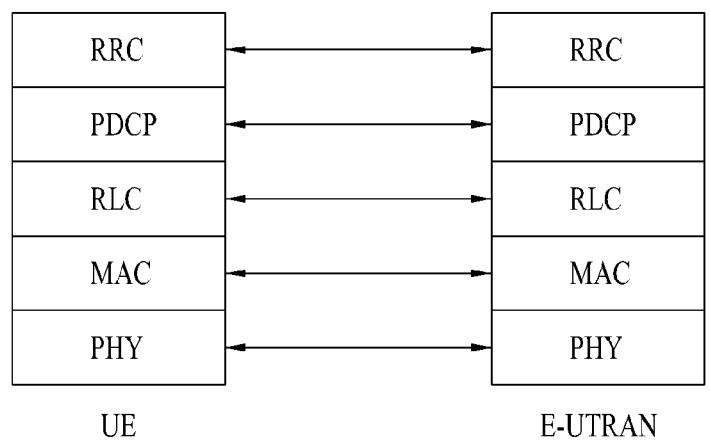
FIG. 2 is a diagram for a control plane of a radio protocol.
Figure 3:
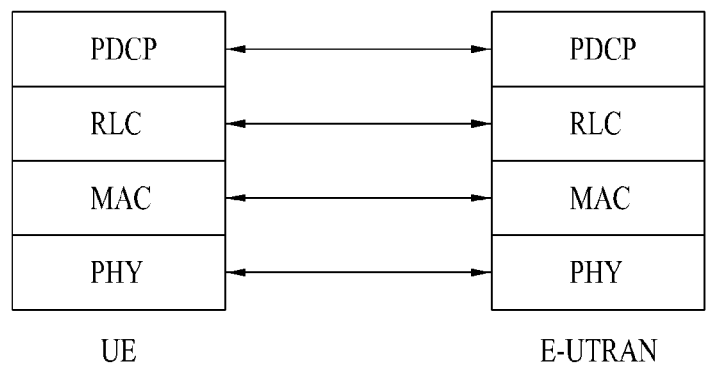
FIG. 3 is a diagram for a user plane of a radio protocol.

A radio interface protocol is defined in the Uu interface as a radio interval. The radio interface protocol horizontally includes a physical layer, a data link layer and a network layer or vertically includes a user plane for user data transport and a control plane for signaling (e.g., control signal) delivery. The above-mentioned radio interface protocol may be generally divided into L1 ($1^{st}$ layer) including a physical layer PHY, L2 ($2^{nd}$ layer) including MAC/RLC/PDCP layer, and L3 ($3^{rd}$ layer) including RRC layer, as shown in FIG. 2 and FIG. 3, based on the 3 lower layers of the OSI (open system interconnection) standard model widely known to the communication systems. These layers exist as pairs in UE and E-UTRAN, respectively, and are responsible for the data transport of the Uu interface.

The respective radio protocol layers are described with reference to FIG. 2 and FIG. 3 as follows. FIG. 2 is a diagram for a control plane of a radio protocol. FIG. 3 is a diagram for a user plane of a radio protocol.

A physical (PHY) layer, which is a $1^{st}$ layer, provides an information transfer service to a higher layer using a physical channel. The PHY layer is connected to a medium access control (MAC) layer on an upper side via a transport channel. And, data is transferred between the MAC layer and the PHY layer via this transport channel. In this case, transport channels may be categorized into a dedicated transport channel and a common transport channel in accordance with whether a channel is shared. And, data is transferred between different PHY layers, and more particularly, between a PHY layer of a transmitting side and a PHY layer of a receiving side via a physical channel using a radio resource.

Various kinds of layers exist in a $2^{nd}$ layer. First of all, a medium access control (MAC) layer plays a role in mapping various logical channels to various transport channels and also plays a logical channel multiplexing role in mapping several logical channels to one transport channel. The MAC layer is connected with a radio link control (RLC) layer, which is a higher layer, via a logical channel. And, logical channels can be mainly categorized into a control channel for carrying information of a control plane and a traffic channel for carrying information of a user plane, in accordance with a type of carried information.

RLC layer of the $2^{nd}$ layer plays a role in adjusting a data size suitable for a lower layer to transmit data via a radio section by performing segmentation and concatenation on data received from a higher layer. In order to secure various kinds of QoS required for each radio bearer (RB), the RLC layer provides 3 kinds of operating modes, i.e., a transparent mode (TM), an un-acknowledged mode (UM) and an acknowledged mode (AM). In particular, AM RLC performs a retransmission function via ARQ (automatic repeat and request) function for reliable data transmission.

A packet data convergence protocol (PDCP) layer of the $2^{nd}$ layer performs a header compression function of reducing an IP packet header size containing relatively large and unnecessary control information to efficiently transmit such IP packet as IPv4 packet, IPv6 packet and the like on a radio section having a narrow bandwidth. This plays a role in increasing transmission efficiency of a radio section by enabling information mandatory for a header part of data to be transmitted. In LTE system, PDCP layer performs a security function as well, which includes ciphering for preventing data interception by a third party and integrity protection for preventing data manipulation by a third party.

A radio resource control (RRC) layer, which is situated at a most upper part of a $3^{rd}$ layer, is defined in a control plane only and is responsible for controlling logical channels, transport channels and physical channels in association with configuration, re-configuration and release of radio bearers (RBs). In this case, a radio bearer (RB) means a logical path provided by $1^{st}$ and $2^{nd}$ layers of a radio protocol for a data delivery between a user equipment and UTRAN. If RB is set, it may generally mean a process for providing properties of a radio protocol layer and channel required for providing a specific service and setting a parameter and an operating method in detail. RB may be categorized into SRB (signaling RB) and DRB (data RB). In particular, the SRB is used as a passage for sending RRC message in a control plane and the DRB is used as a passage for transferring user data in a user plane.

Carrier Aggregation Technology

Figure 4:
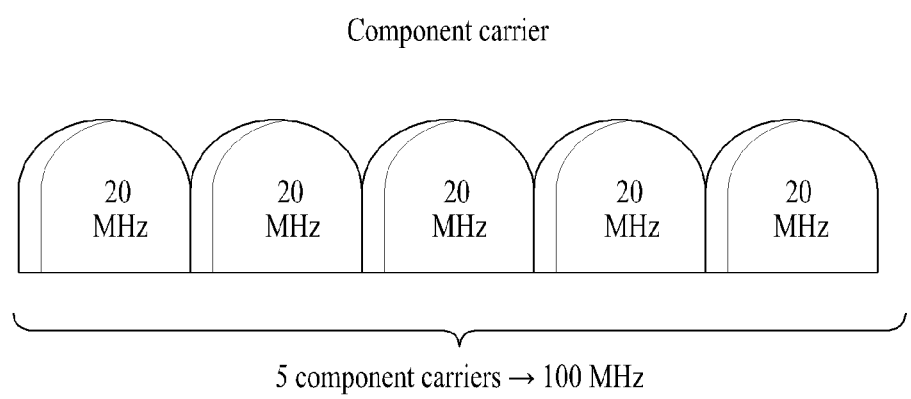
FIG. 4 is a diagram for carrier aggregation.

Carrier aggregation technology for supporting multiple carriers is described with reference to FIG. 4 as follows.

As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

UL/DL L2 Structure in Consideration of Carrier Aggregation Technology

Figure 5:
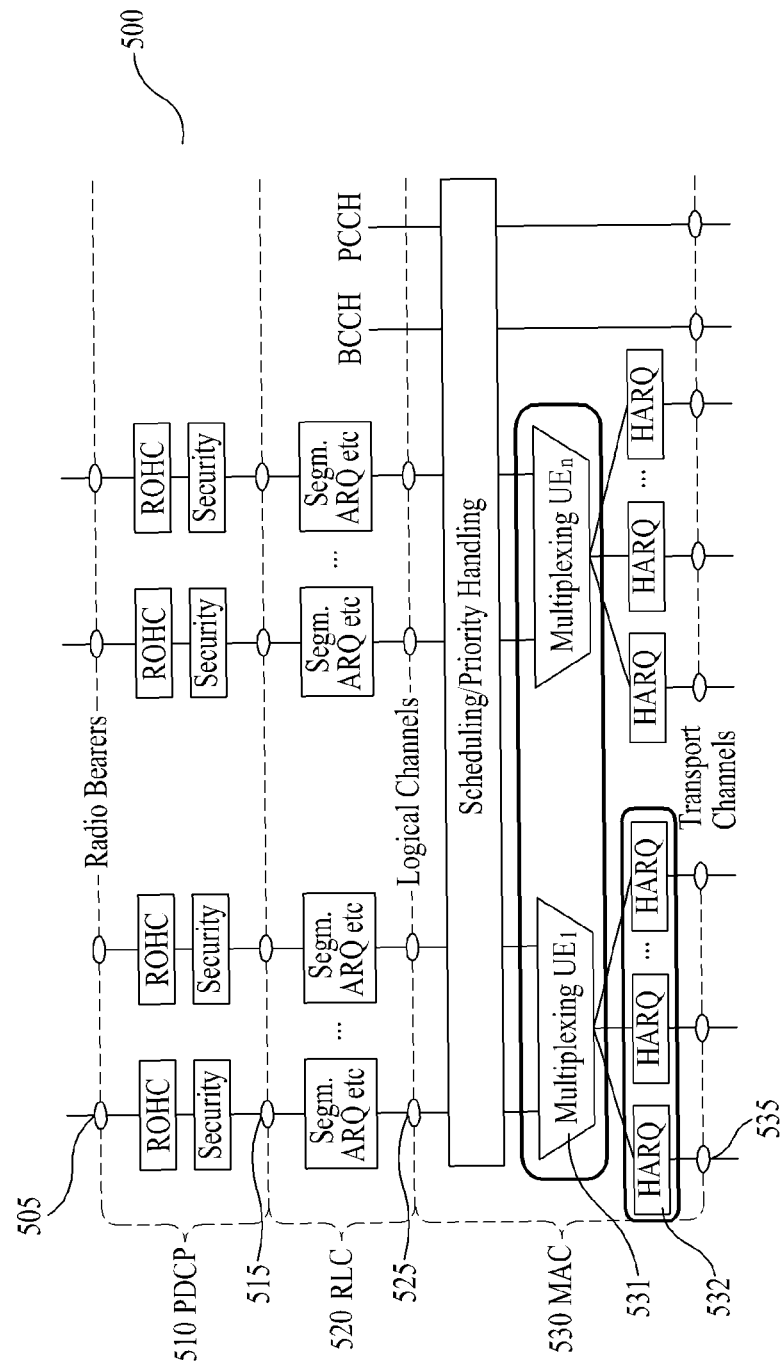
FIG. 5 is a diagram for a structure of downlink L2 ($2^{nd}$ layer) in carrier aggregation.
Figure 6:
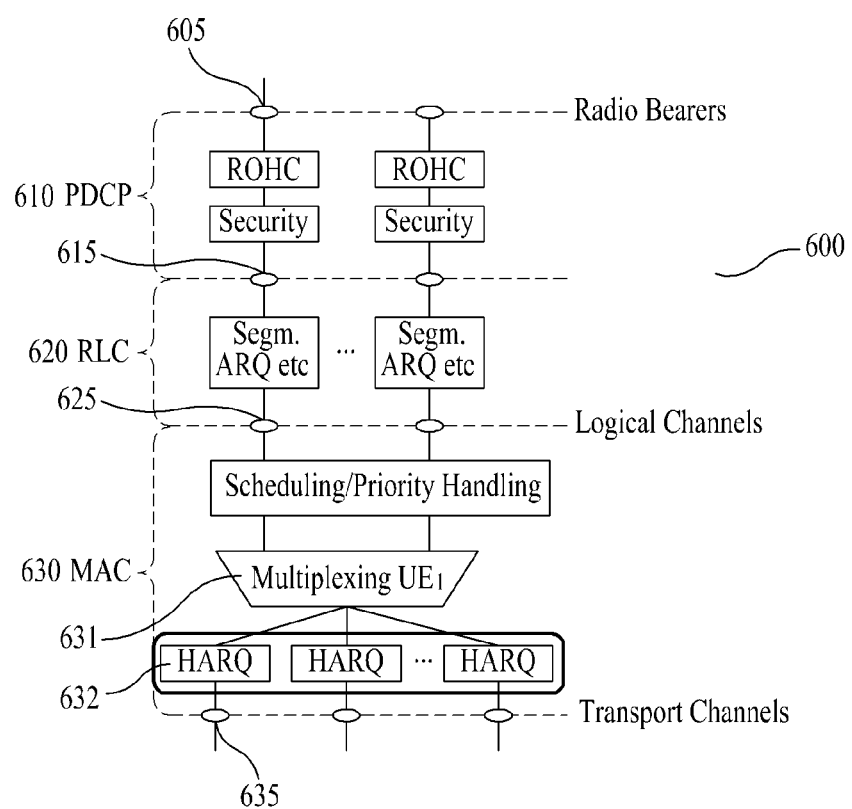
FIG. 6 is a diagram for a structure of uplink L2 ($2^{nd}$ layer) in carrier aggregation.

A structure of L2 ($2^{nd}$ layer) is described with reference to FIG. 5 and FIG. 6 as follows. FIG. 5 is a diagram for a structure of downlink L2 ($2^{nd}$ layer) in carrier aggregation. And, FIG. 6 is a diagram for a structure of uplink L2 ($2^{nd}$ layer) in carrier aggregation.

In a DL L2 structure 500 shown in FIG. 5, layers of PDCP 510, RLC 520 and MAC 530 are represented. In FIG. 5, elements 505, 515, 525 and 535 provided to interfaces between the layers indicate service access points (SAP) for peer-to-peer communications. The SAP between PHY channel (not shown in the drawing) and the MAC layer provides a transport channel [535]. And, the SAP between the MAC layer and the RLC layer provides a logical channel [525]. General operations of the respective layers are as good as mentioned in the foregoing description.

The MAC layer multiplexes a plurality of logical channels (i.e., radio bearers) from the RLC layer. In the DL L2 structure, a plurality of entities 531 of the MAC layer are related to the application of MIMO (multiple input multiple output) technology. Since one transport channel is generated by multiplexing a plurality of logical channels in case of non-MIMO in a system that does not consider carrier aggregation technology, one HARQ (hybrid automatic repeat and request) entity is provided to one multiplexing entity 531 [not shown in the drawing].

On the other hand, in a system that considers carrier aggregation technology, a plurality of transport channels corresponding to a plurality of component carriers are generated. Regarding this, in the carrier aggregation technology, one HARQ entity 532 manages one component carrier. Hence, the MAC layer 530 of the system, which supports the carrier aggregation technology, provides one multiplexing entity 531 with a plurality of HARQ entities 532 and performs operations related to them. Since each of the HARQ entities 532 handles transport block independently, a plurality of transport blocks may be simultaneously transmitted/received via a plurality of component carriers.

The UL L2 structure 600 shown in FIG. 6 performs the same operations of the DL L2 structure 500 shown in FIG. 5 except that one multiplexing entity 630 is included in one MAC layer 630. In particular, a plurality of HARQ entities 632 are provided for a plurality of component carriers, operations related to a plurality of the HARQ entities 632 are performed in the MAC layer 630, and a plurality of transport blocks can be simultaneously transmitted/received via a plurality of the component carriers.

Physical Downlink Control Channel (PDCCH)

A physical downlink control channel (PDCCH) is one of downlink control channels used by 3GPP LTE system. PDCCH may contain paging information of a paging channel (PCH) and the like. A plurality of PDCCHs may be transmitted within a control region and a user equipment may monitor a plurality of the PDCCHs. A base station determines a PDCCH format in accordance with downlink control information (DCI) transmitted to a user equipment and attaches a cyclic redundancy check (CRC) to control information. The CRC is masked with an identifier called a radio network temporary identifier (RNTI) in accordance with an owner or usage of PDCCH. For instance, if PDCCH is provided for a paging message, CRC may be masked with a paging indicator identifier (P-RNTI).

Paging Channel

Figure 7:
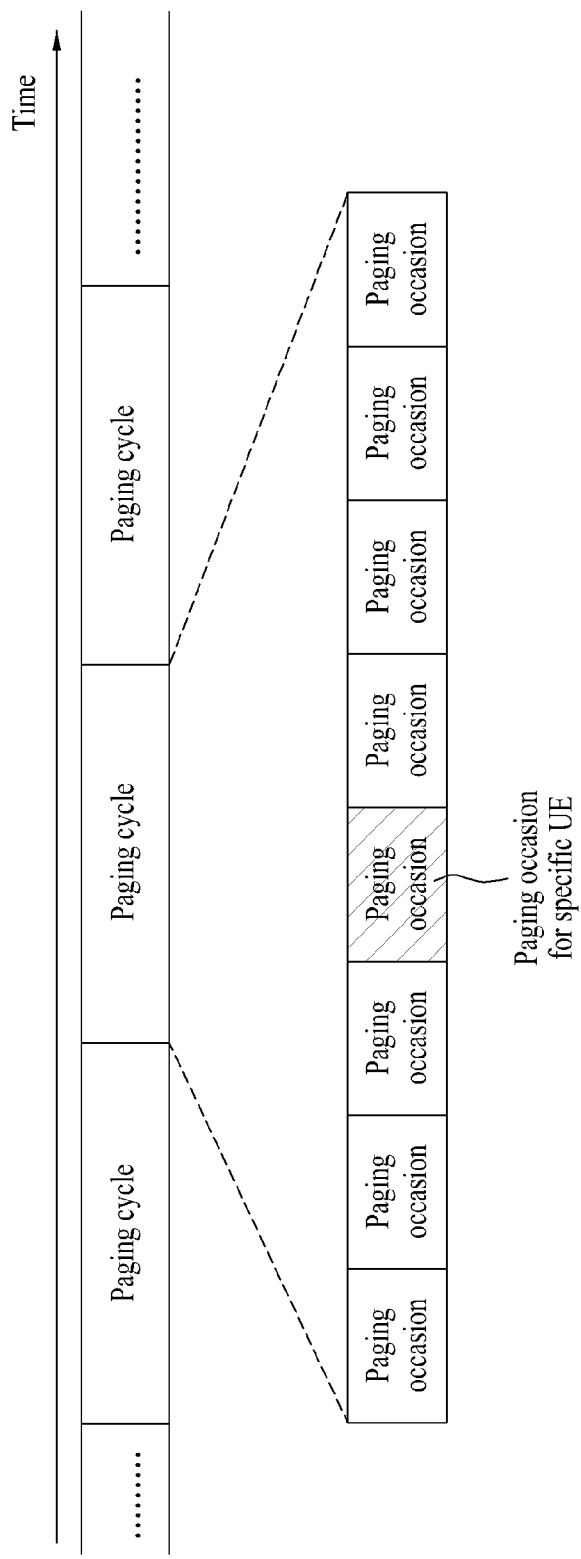
FIG. 7 is a diagram for describing a transmission of a paging channel.

A transmission of a paging channel is described with reference to FIG. 7 as follows.

First of all, discontinuous reception (DRX) is described. The discontinuous reception (DRX) is an operation that relates to when a base station will send information on allocation of a radio resource to a user equipment in the course of a communication between the base station and the base station. If a user equipment monitors a downlink (DL) channel for carrying information related to the radio resource allocation, and more particularly, PDCCH all the time, it may cause a problem of power consumption. To solve this problem, a base station transmits radio resource allocation information to a user equipment on PDCCH in a specific time only. The user equipment receives the radio resource allocation information via the PDCCH in the specific time only. Since the user equipment needs not to monitor the PDCCH during other time except the specific time, the user equipment may be able to reduce its power consumption by turning off its receiving module.

When a paging message is received, a user equipment is able to perform a discontinuous reception (DRX) for the purpose of reduction of power consumption. For this, a network configures several paging occasions in each time cycle called a paging DRX cycle and enables a specific user equipment to perform a reception attempt and acquisition of a paging message on a specific paging occasion only. The user equipment does not receive a paging channel during the rest of time except the specific paging occasion. And, one paging occasion corresponds to one TTI.

An operation of receiving a paging channel in a user equipment is described in detail as follows.

First of all, a user equipment receives a downlink (DL) channel on each designated paging occasion. In particular, the user equipment wakes up in a subframe matching the corresponding paging occasion and then receives PDCCH. In doing so, if the user equipment receives P-RNTI (paging-RNTI) corresponding to a paging via the PDCCH, the user equipment receives a radio resource indicated by the PDCCH. On the radio resource indicated by the PDCCH, a substantial paging message is transmitted. The user equipment receives the paging message and then checks whether an identifier (e.g., identifier identical to IMSI (international mobile subscriber identity) assigned to the user equipment) of the user equipment exists. If there is a matched identifier, the user equipment informs an upper stage that a paging has arrived.

Notification of System Information Change

System information (SI) includes parameters required for a user equipment to obtain other information from a base station and the like. If system information (SI) is changed, it may be necessary to inform a user equipment that the system information has been changed. This operation is described in detail as follows.

Notification of system information change means that a base station informs user equipments of information on a change of system information. This notification should be performed in the first place when a base station changes system information. The change of system information takes place in specific radio frames only. For the notification of the system information change, a concept of modification period is used. The modification period includes a specific number of radio frames. The system information may be transmitted plural times with the same content in one modification period. A base station performs the notification of the change of the system information in $n^{th}$ modification period and is then able to transmit the changed system information to a user equipment in $(n+1)^{th}$ modification period.

Figure 8:
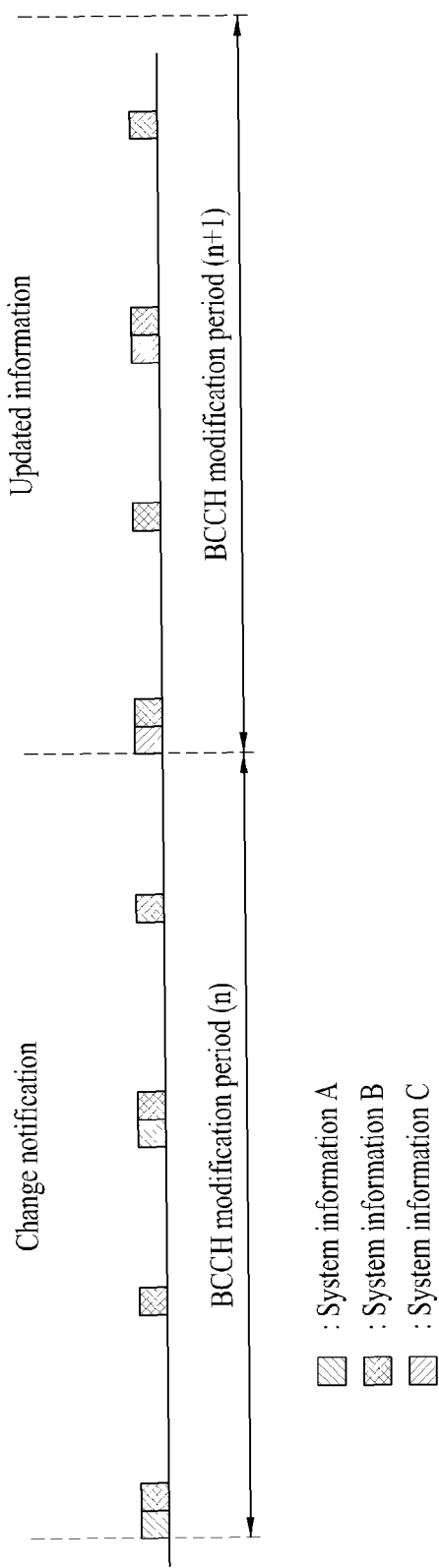
FIG. 8 is a diagram for describing an information notification of system information modification and a system information transmitting method.

FIG. 8 is a diagram for describing an information notification of system information modification and a system information transmitting method. If a user equipment receives a change notification in a modification period (n), a user equipment operates in a manner of obtaining a new system information (e.g., an updated system information of a next modification period (n+1). The user equipment applies a previous system information until obtaining the new system information.

Paging message is used to notify a system information change to user equipments in RRC_IDLE mode and user equipments in RRC_CONNECTED mode both. The paging message may contain system information modification (systemInfoModification) information indicating the system information change. If a user equipment receives a paging message containing systemInfoModification information in a specific modification period, the user equipment may be able to recognize that system information will be changed in a next modification period.

Yet, the paging message indicates a fact of the system information change only but does not contain information indicating which system information has been changed. In particular, the user equipment may be able to recognize information, which indicates whether a change of system information will occur, from presence/absence of the systemInfoModification information within the paging message.

In the following description, explained is a case that a notification method of a system information change via a paging message is applied to a multi-carrier environment according to carrier aggregation (CA) technology.

First of all, in order to communicate with a user equipment using CA function, a base station is able to set a plurality of component carriers (CCs) for the corresponding user equipment. In order to operate and manage the CCs, the base station transmits system information related to a corresponding CC to user equipments via each of the CCs. For instance, assuming that 2 CCs [hereinafter named CC(a) and CC(b), respectively], the base station transmits system information related to CC(a) via the CC(a) and also transmits system information related to CC(b) via the CC(b).

In this situation, as mentioned in the foregoing description of the notification of the system information change via the paging message, if a user equipment determines a fact of the change of the system information for each of the CCs, it may be able to consider the following scenario.

(1) Assume that a user equipment has CA function and communicates with a base station using 2 CCs [hereinafter named CC(a) and CC(b), respectively].

(2) System informations on the CCs are transmitted on downlink CCs [hereinafter named DL CC(a) and DL CC(b), respectively] corresponding to the CCs, respectively. In particular, the system information of the CC(a) is carried on the DL CC(a) only and the system information of the CC(b) is carried on the DL CC(b) only.

(3) In order to obtain a fact of a change of the system information on each of the CCs, the user equipment attempts a reception of a paging message carried on each of the DL CCs. In particular, a presence or non-presence of the system information change for the CC(a) can be obtained from the paging message on the DL CC(a) only and a presence or non-presence of the system information change for the CC(b) can be obtained from the paging message on the DL CC(b) only. Hence, the user equipment should attempt a reception of the paging message carried on the DL CC(b) as well as a reception of the paging message carried on the DL CC(a).

In particular, as CA function is supported, if a plurality of CCs are set for a user equipment, the user equipment should attempt all receptions of paging messages carried on the CCs in order to determine facts of changes of system informations carried on the CCs, respectively. Therefore, battery consumption of the user equipment may be increased.

Meanwhile, in case that a plurality of CCs are set for a user equipment, it may be able to set the user equipment to monitor a specific CC only. In particular, in order to prevent battery consumption of a user equipment, it may be able to set the user equipment to attempt a paging message reception via a specific CC [e.g., primary component carrier (or P-Cell)] only. In this case, according to a previous paging message configuration, information on a system information change on a corresponding carrier carrying a paging message may be contained in the paging message only but information on a system information change on another carrier is not contained in the paging message. Hence, since a user equipment is unable to monitor a paging message (particularly, information indicating a presence or non-presence of a system information change included in the paging message) for the rest of CCs [e.g., secondary component carrier (or S-Cell)] set for the user equipment, even if system informations of the rest of the CCs are changed, the user equipment may not be able to attempt the corresponding system information acquisition.

Therefore, the present invention proposes a following method. First of all, a base station sends a paging message containing information on a system information change for each of a plurality of CCs to a user equipment. Secondly, the user equipment receives the paging message, determines whether there is the system information change of the CC set for the ser equipment, and then obtains system information of the corresponding CC. In the following description, optionally applicable items are explained in detail.

First of all, a user equipment may be able to attempt a reception of the paging message via a predetermined CC only. Information on the predetermined CC carrying the paging message may be set for the user equipment by a base station or may be set in accordance with rules provided by the standard. In particular, assuming that a plurality of CCs set for the user equipment include CC(1), CC(2) and CC(30), respectively, the user equipment may attempt a reception of a paging message for one of the CCs only according to the above-mentioned setting. For instance, a paging message may be received by the user equipment via a primary component carrier (or P-cell). In this case, the attempt of the reception of the paging message may mean that a reception of PDCCH transmitted in a manner of masking CRC with P-RNTI is attempted.

Information on system information changes of a plurality of CCs may be contained in the paging message. Preferably, the paging message may be able to contain information on system information changes for all CCs provided by a base station. Accordingly, although the information of changes of system informations on CCs failing to be set for the user equipment may be contained in the paging message received by the user equipment, the user equipment considers the information on the CCs set for the user equipment itself only.

The paging message may contain system information modification (systemInfoModification) information per CC.

For instance, assume that a base station 5 CCs and that the CCs are categorized into CC(1), CC(2), CC(3), CC(4) and CC(5). If the base station attempts to change system information on CC(2) and system information on CC(4) in $(n+1)^{th}$ modification period, the base station sends a paging message to a user equipment in $n^{th}$ modification period in a manner that systemInfoModification information of the CC(2) and systemInfoModification information of the CC(4) are contained in the paging message. Thereafter, the base station transmits a modified system information on the CC(2) and a modified system information on the CC(4) to the user equipment in $(n+1)^{th}$ modification period.

If systemInfoModification informations corresponding to CCs set for the user equipment exist among per-CC systemInfoModification informations included in the paging message, the user equipment determines that system information of the corresponding CC will be changed. For instance, assume that CC(1) and CC(3) are set or the user equipment.

And, assume that systemInfoModification information for CC(2), systemInfoModification information for CC(3) and systemInfoModification information for CC(4) are contained in the paging message. In this case, since the CC(3) is the CC set for the user equipment among the per-CC systemInfoModification informations contained in the paging message, the user equipment determines that the system information of the CC(3) will be changed. Thereafter, the user equipment ma attempt acquisition of the system information of the CC(3) in a next modification period.

If the user equipment determines that system information of a specific one of CCs set for the user equipment will be changed through the paging message, the user equipment may be able to operate to acquire a changed system information carried on the corresponding CC right after a start of a next modification period. Details of the acquisition of system information may refer to Paragraph 5.2.2 of the standard 3GPP LTE TS36.331 vs.6.0 (2009-06).

The above-mentioned specific CC may be divided into an uplink CC (UL CC) and a downlink CC (DL CC). The changed system information of the specific CC may be carried on the DL CC.

Figure 9:
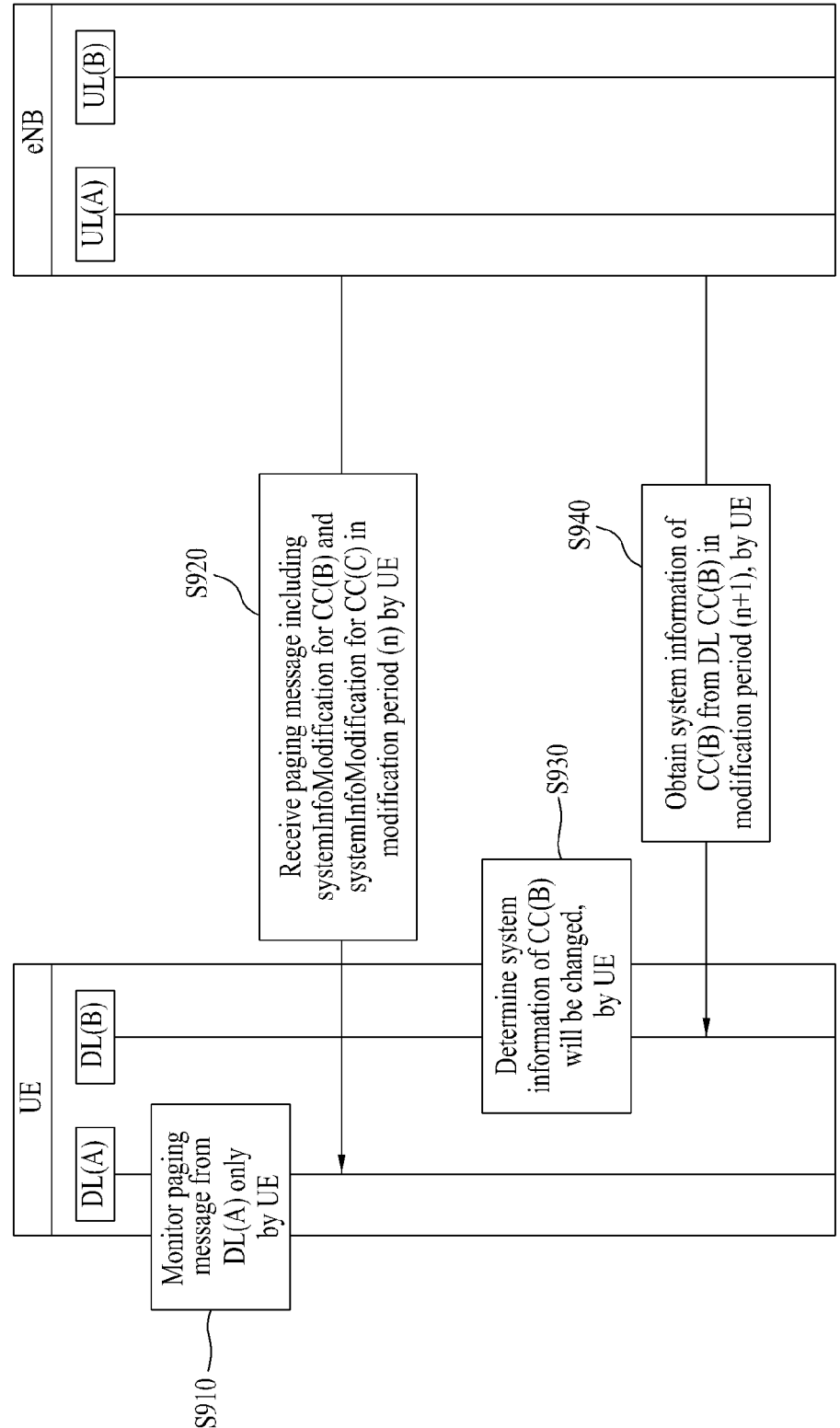
FIG. 9 is a diagram for describing a method of managing system information according to one embodiment of the present invention.

System information managing operations of a user equipment and a base station according to one embodiment of the present invention are described with reference to FIG. 9 as follows.

Assume that 2 CCs [hereinafter named CC(A) and CC(B), respectively] are set for a user equipment by a base station for CA function. Each of the CCs may include UL CC and DL CC. In particular, assume that the user equipment may be set to use 2 UL CCs [hereinafter named UL(A) and UL(B), respectively] and 2 DL CCs [hereinafter named DL(A) and DL(B), respectively]. Assume that UL (A) is mapped to DL (A). Assume that UL(B) is mapped to DL(B).

In order to receive a paging message from the base station, the user equipment may be set to monitor a specific DL CC only. For instance, the user equipment may monitor the DL CC(A) only to receive the paging message [Step S910].

The user equipment receive PDCCH on the DL CC(A) each designated paging occasion. If the user equipment receives P-RNTI corresponding to a paging via the PDCCH, the user equipment may be able to receive the paging message from the base station by receiving a radio resource indicated by the PDCCH [Step S920]. In this case, assume that the paging message is received in $n^{th}$ modification period.

Information (e.g., systemInfoModification information) indication whether system information is changed for each of a plurality of CCs may be included in the paging message by the base station. The information on the system information changes of a plurality of the CCs can be contained in the paging message irrespective of whether the corresponding CC is set for the corresponding user equipment. Moreover, information indicating a presence or non-presence of system information changes of all CCs provided by the base station may be contained in the paging message. Alternatively, systemInfoModification information on each of CCs, of which system information will be changed, may be contained in the paging message.

For instance, systemInfoModification indicating a system information change for the CC(B) and systemInfoModification indicating a system information change for the CC(C) may be contained in the paging message from the base station. Although the CC(C) corresponds to the CC not set for the user equipment, it may be contained in the paging message received by the corresponding user equipment.

After the user equipment has received the paging message, the user equipment may be able to determine which CC needs the acquisition of the system information using the CCs [CC(A) and CC(B)] set for the user equipment and the information on the per-CC system information change contained n the paging message (i.e., the information on the system information change of the CC(B) and the information on the system information change of the CC(C)) [Step S930]. For instance, since CC(A) and CC(B) are set for the user equipment and the information on the system information change of the CC(B) and the information on the system information change of the CC(C) are contained in the paging message, the user equipment may be able to recognize that the system information of the CC(B) has been changed and may determine that the acquisition of the system information of the CC(B) is requested.

Accordingly, the user equipment is able to acquire the system information of the CC(B) in $(n+1)^{th}$ modification period [Step S940]. In particular, since the system information of the CC(B) is transmitted on the DL CC(B), the user equipment acquires the system information of the CC(B) via the DL CC(B).

According to the above-described embodiment, the paging message containing the information indicating the system information change for each of a plurality of the CCs is received by the user equipment via the DL CC(A) only, which non-limits the base station to transmit the corresponding paging message via the DL CC(A) only. In particular, the base station may be able to transmit the same paging message (e.g., the paging message containing the information indicating the system information change for each of a plurality of the CCs) via the DL CCs provided by the base station entirely or in part. And, a specific one of a plurality of the DL CCs is monitored only in viewpoint of the reception of the user equipment. In this case, as mentioned in the foregoing description, the specific DL CC (e.g., DL primary component carrier (or P-Cell) may be set by the base station or may be set in accordance with the rules defined in the standard.

According to one embodiment of the present invention mentioned in the foregoing description, a base station transmits a paging message containing information on a system information change for each of a plurality of CCs to a user equipment. And, the user equipment may be then able to acquire system information of the corresponding CC. Since the user equipment uses one CC only in monitoring the paging message, it may be able to reduce battery consumption of the user equipment. Moreover, even if a paging message is received via one CC only, since information indicating a CC, for which system information will be changed, among CCs set for the user equipment is contained in the paging message, the user equipment may be able to acquire the changed system information of the corresponding CC.

Figure 10:
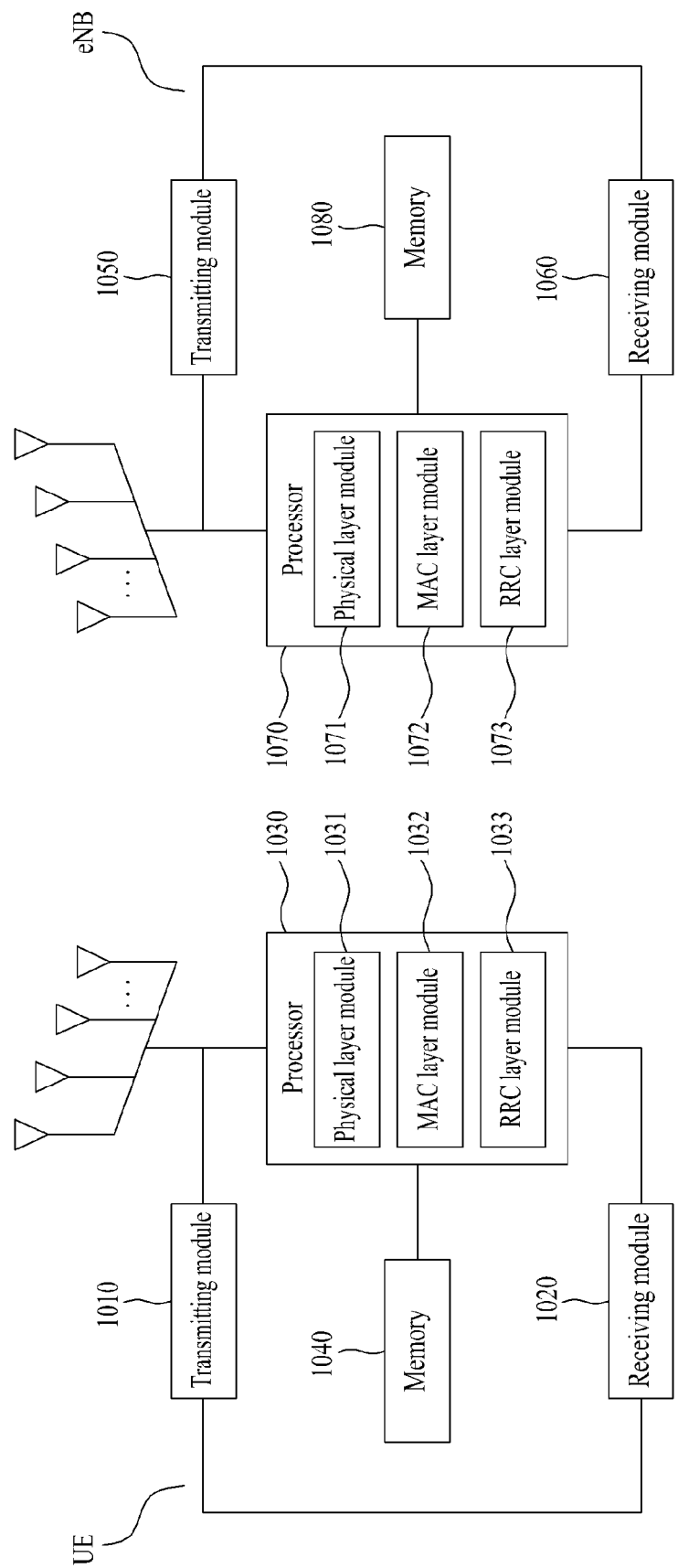
FIG. 10 is a diagram for describing a configuration of a user equipment device according to one embodiment of the present invention.

FIG. 10 is a diagram for describing a configuration of a user equipment according to one embodiment of the present invention.

Referring to FIG. 10, a user equipment (UE) may include a transmitting module 1010, a receiving module 1020, a processor 1030, a memory 1040 and an antenna.

The transmitting module 1010 may be able to transmit various signals, data and information via at least one uplink component carrier to a base station. The receiving module 1020 may be able to receive various signals, data and information via downlink component carrier from a base station. The processor 1030 controls transmissions and receptions of various signals, data and information via the receiving module 1010 and the transmitting module 1020 and may be able to control overall operations of the user equipment device 1000. The antenna may include a single antenna or a plurality of antennas. If a plurality of the antennas are provided to at least one of a transmitting side and a receiving side, it may be able to support MIMO (multiple input multiple output) transmission.

The processor 1030 of the user equipment may include a physical layer module 1031, a MAC layer module 1032 and an RRC layer module 1033.

The physical layer module 1031 maps a transport channel from the MAC layer module 1032 to an uplink physical channel and then transmits it to a base station. The physical layer module 1031 receives a downlink physical channel from the base station, processes the received downlink physical channel, and may deliver it to the MAC layer module 1032 via the transport channel. The physical layer module 1031 is functionally connected with the MAC layer module 1032 and may be then able to perform a signal transmission on at least one uplink component carrier and a signal reception on at least one downlink component carrier. And, the physical layer module 1031 may be able to receive a paging message by monitoring PDCCH and may be able to receive system information.

The MAC layer module 1032 includes a plurality of HARQ entities respectively corresponding to a plurality of component carriers. The MAC layer module 1032 may be able to control a signal transmission on at least one uplink component carrier and a signal reception on at least one downlink component carrier via a plurality of the HARQ entities.

The RRC layer module 1033 performs control functions of logical channels, transport channels and physical channels in association with configuration, re-configuration and release of radio bearers (RBs). In this case, the RB may mean a service provided by a $2^{nd}$ layer (e.g., MAC layer, RLC layer, PDCP layer) for data transfer between a user equipment and a base station. For this, the RRC layer module 1033 enables RRC message to be exchanged between the base station and the user equipment. Moreover, the RRC layer module 1033 performs an RRC connection control function including a paging.

The processor 1030 of the user equipment (UE) according to one embodiment of the present invention may be configured to receive a message containing information on a system information change (systemInfoModification) of at least one component carrier from a base station via the physical layer module 1031. In this case, the message may include a paging message. The information on the system information change includes system information of all component carriers provided by the base station and may be able to indicate a presence or non-presence of the system information change of each of the component carriers. The processor 1030 may be further configured to receive the paging message by monitoring the PDCCH on at least one predetermined downlink component carrier (e.g., downlink component carrier (or P-cell)). And, the processor 1030 may be further configured to receive the paging message in $n^{th}$ modification period.

The processor 1030 may be further configured to determine whether the system information of the component carrier set for the user equipment will be changed, from the information on the system information change of the at least one component carrier, via the RRC layer module 1033. In this case, the component carrier, for which whether the system information will be changed is determined, may include at least one of at least one uplink component carrier set for the user equipment and at least one DL component carrier.

If the processor 1030 determines that the system information of the component carrier set for the user equipment will be changed, the processor 1030 may be further configured to acquire the changed system information of the component carrier set for the user equipment. In this case, the changed system information may be acquired in $(n+1)^{th}$ modification period.

Besides, the processor 1030 may perform a function of operating information received by the user equipment, information to be externally transmitted by the user equipment and the like. The memory 1040 may be able to store the operated information for prescribed duration and may be substituted with such a component as a buffer (not shown in the drawing) and the like.

Meanwhile, a base station (eNB) may include a transmitting module 1050, a receiving module 1060, a processor 1070, a memory 1080 and an antenna.

The transmitting module 1050 may be able to transmit various signals, data and information via at least one uplink component carrier to a user equipment. The receiving module 1060 may be able to receive various signals, data and information via downlink component carrier from the user equipment. The processor 1070 controls transmissions and receptions of various signals, data and information via the receiving module 1060 and the transmitting module 1050 and may be able to control overall operations of the base station (eNB). The antenna may include a single antenna or a plurality of antennas. If a plurality of the antennas are provided to at least one of a transmitting side and a receiving side, it may be able to support MIMO (multiple input multiple output) transmission.

The processor 1070 of the base station may include a physical layer module 1071, a MAC layer module 1072 and an RRC layer module 1073.

The physical layer module 1071 maps a transport channel from the MAC layer module 1072 to a downlink physical channel and then transmits it to the user equipment. The physical layer module 1071 receives an uplink physical channel from the user equipment, processes the received uplink physical channel, and may deliver it to the MAC layer module 1072 via the transport channel. The physical layer module 1071 is functionally connected with the MAC layer module 1072 and may be then able to perform a signal transmission on at least one uplink component carrier and a signal reception on at least one downlink component carrier. And, the physical layer module 1071 may be able to transmit a paging message and system information.

The MAC layer module 1072 includes a plurality of HARQ entities respectively corresponding to a plurality of component carriers. The MAC layer module 1032 may be able to control a signal transmission on at least one uplink component carrier and a signal reception on at least one downlink component carrier via a plurality of the HARQ entities.

The RRC layer module 1073 performs control functions of logical channels, transport channels and physical channels in association with configuration, re-configuration and release of radio bearers (RBs). In this case, the RB may mean a service provided by a $2^{nd}$ layer (e.g., MAC layer, RLC layer, PDCP layer) for data transfer between a user equipment and a base station. For this, the RRC layer module 1073 enables RRC message to be exchanged between the base station and the user equipment. Moreover, the RRC layer module 1073 performs an RRC connection control function including a paging.

The processor 1070 of the base station (eNB) according to one embodiment of the present invention may be configured to transmit a message containing information on a system information change (systemInfoModification) of at least one component carrier via the physical layer module 1071. In this case, the message may include a paging message. The information on the system information change includes system information of all component carriers provided by the base station and may be able to indicate a presence or non-presence of the system information change of each of the component carriers. And, the processor 1030 may be further configured to receive the paging message in $n^{th}$ modification period.

The paging message transmitted by the base station is received by the user equipment to facilitate the system information acquisition of the user equipment. In particular, the user equipment (UE) receives the paging message by monitoring the PDCCH on at least one predetermined downlink component carrier (e.g., downlink component carrier (or P-cell)). The processor 1030 determines whether the system information of the component carrier set for the user equipment will be changed, from the information on the system information change of the at least one component carrier. In this case, the component carrier, for which whether the system information will be changed is determined, may include at least one of at least one uplink component carrier set for the user equipment and at least one DL component carrier.

The processor 1070 of the base station may be further configured to transmit the changed system information. In this case, the changed system information may be transmitted in $(n+1)^{th}$ modification period.

Besides, the processor 1070 may perform a function of operating information received by the user equipment, information to be externally transmitted by the user equipment and the like. The memory 1080 may be able to store the operated information for prescribed duration and may be substituted with such a component as a buffer (not shown in the drawing) and the like.

The above-described embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided in a manner of being implemented by those skilled in the art to which the present invention pertains. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the above-mentioned embodiments of the present invention are mainly described on the assumption of the 3GPP LTE series systems, by which the present invention may be non-limited. And, the present invention may be usable for a user equipment to perform a system information managing method in various kinds of carrier aggregation applied wireless communication systems in the same manner.

What is claimed is:

1. A method of obtaining system information by a user equipment in a wireless communication system supporting multi-carriers, the method comprising:
    receiving a message including information on a system information modification (systemInfoModification) of a plurality of component carriers from a base station;
    determining whether the system information of each component carrier configured for the user equipment among the plurality of component carriers is to be modified, based on the information on the system information modification of the plurality of component carriers; and
    obtaining the modified system information of at least one component carrier configured for the user equipment, if the system information of the at least one component carrier configured for the user equipment is determined to be modified,
    wherein the information on the system information modification of the plurality of component carriers is the information indicating whether the system information for each of the plurality of component carriers is to be modified,
    wherein the message is received only on one predetermined downlink component carrier among the plurality of component carriers, and the modified system information of one of the at least one component carrier is received by the user equipment on the one of the at least one component carrier,
    wherein the at least one component carrier includes a component carrier other than the one predetermined component carrier, and
    wherein receiving the message comprises monitoring a physical downlink control channel (PDCCH), and a cyclic redundancy check (CRC) code of PDCCH is masked with Paging-Radio Network Temporary Identifier (P-RNTI).

2. The method of claim 1, wherein the one predetermined downlink component carrier is a downlink primary component carrier or P-cell.

3. The method of claim 1, wherein receiving the message is performed in $n^{th}$ modification period and wherein the obtaining the modified system information is performed in $(n+1)^{th}$ modification period.

4. The method of claim 1, wherein the component carrier configured for the user equipment includes at least one of at least one uplink component carrier or at least one downlink component carrier configured for the user equipment.

5. The method of claim 1, wherein the message comprises a paging message.

6. A method of providing system information to a user equipment by a base station in a wireless communication system supporting multi-carriers, the method comprising:

transmitting a message including information on a system information modification (systemInfoModification) of a plurality of component carriers; and transmitting a modified system information of at least one component carrier among the plurality of component carriers, wherein the message including information on the system information modification of the plurality of component carriers is used to determine whether the system information of each component carrier configured for the user equipment among the plurality of component carriers is to be modified, wherein the modified system information of the at least one component carrier is obtained by the user equipment as the modified system information of the at least one component carrier configured for the user equipment, if the system information of the at least one component carrier configured for the user equipment is determined to be modified, wherein the information on the system information modification of the plurality of component carriers is the information indicating whether the system information for each of the plurality of component carriers is to be modified, wherein the message is transmitted only on one predetermined downlink component carrier among the plurality of component carriers, and the modified system information of one of the at least one component carrier is transmitted to the user equipment on the one of the at least one component carrier, wherein the at least one component carrier includes a component carrier other than the one predetermined component carrier, and wherein the message is transmitted via a physical downlink control channel (PDCCH), and a cyclic redundancy check (CRC) code of the PDCCH is masked with Paging-Radio Network Temporary Identifier (P-RNTI).

7. The method of claim 6, wherein the one predetermined downlink component carrier is a downlink primary component carrier or P-cell.

8. The method of claim 6, wherein the transmitting the message is performed in $n^{th}$ modification period and wherein the transmitting the modified system information is performed in $(n+1)^{th}$ modification period.

9. The method of claim 6, wherein the component carrier configured for the user equipment includes at least one of at least one uplink component carrier or at least one downlink component carrier configured for the user equipment.

10. The method of claim 6, wherein the message comprises a paging message.

11. A user equipment for obtaining system information in a wireless communication system supporting multi-carriers, the user equipment comprising:

a processor comprising:

an RRC (Radio Resource Control) layer module performing a RRC connection control function including a paging;

a MAC (medium access control) layer module controlling signal transmission and reception set for the user equipment via the multi-carriers; and a physical layer module functionally connected with the MAC layer module, the physical layer module performing the signal transmission and reception via the multi-carriers set for the user equipment, the processor is configured to:

receive a message including information on a system information modification (systemInfoModification) of a plurality of component carriers from a base station, determine whether the system information of each component carrier configured for the user equipment among the plurality of component carriers is to be modified, based on the information on the system information modification of the plurality of component carriers via the RRC layer module, obtain the modified system information of at least one component carrier configured for the user equipment, if the system information of the at least one component carrier configured for the user equipment is determined to be modified, wherein the information on the system information modification of the plurality of component carriers is the information indicating whether the system information for each of the plurality of component carriers is to be modified, wherein the message is received only on one predetermined downlink component carrier among the plurality of component carriers, and the modified system information of one of the at least one component carrier is received by the user equipment on the one of the at least one component carrier, wherein the at least one component carrier includes a component carrier other than the one predetermined component carrier, and wherein receiving the message comprises monitoring a physical downlink control channel (PDCCH), and a cyclic redundancy check (CRC) code of PDCCH is masked with Paging-Radio Network Temporary Identifier (P-RNTI).

12. A base station for providing system information in a wireless communication system supporting multi-carriers, the base station comprising:

a processor comprising:

an RRC (radio resource control) layer module performing a RRC connection control function including a paging;

a MAC (medium access control) layer module controlling signal transmission and reception set for the user equipment via the multi-carriers; and a physical layer module functionally connected with the MAC layer module, the physical layer module performing the signal transmission and reception via the multi-carriers, the processor is configured to:

transmit a message including information on a system information modification (systemInfoModification) of a plurality of component carriers via the physical layer module and transmit a modified system information of at least one component carrier among the plurality of component carriers, wherein the message including information on the system information modification of the plurality of component carriers is used by the user equipment to determine whether the system information of each component carrier configured for the user equipment among the plurality of component carriers is to be modified, wherein the modified system information of the at least one component carrier is obtained by the user equipment as the modified system information of the at least one component carrier configured for the user equipment, if the system information of the at least one component carrier configured for the user equipment is determined to be modified, wherein the information on the system information modification of the plurality of component carriers is the information indicating whether the system information for each of the plurality of component carriers is to be modified, wherein the message is transmitted only on one predetermined downlink component carrier among the plurality of component carriers, and the modified system information of one of the at least one component carrier is transmitted to the user equipment on the one of the at least one component carrier, wherein the at least one component carrier includes a component carrier other than the one predetermined component carrier, and wherein the message is transmitted via a physical downlink control channel (PDCCH), and a cyclic redundancy check (CRC) code of the PDCCH is masked with Paging-Radio Network Temporary Identifier (P-RNTI).

\* \* \* \* \*